Aug. 28, 1923.
G. CHRISTENSON
METHOD OF MAKING PISTON ROD PACKING
Filed Sept. 1, 1920
1,466,086
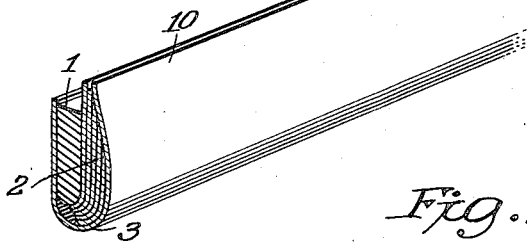
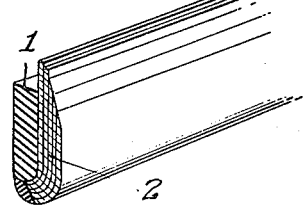
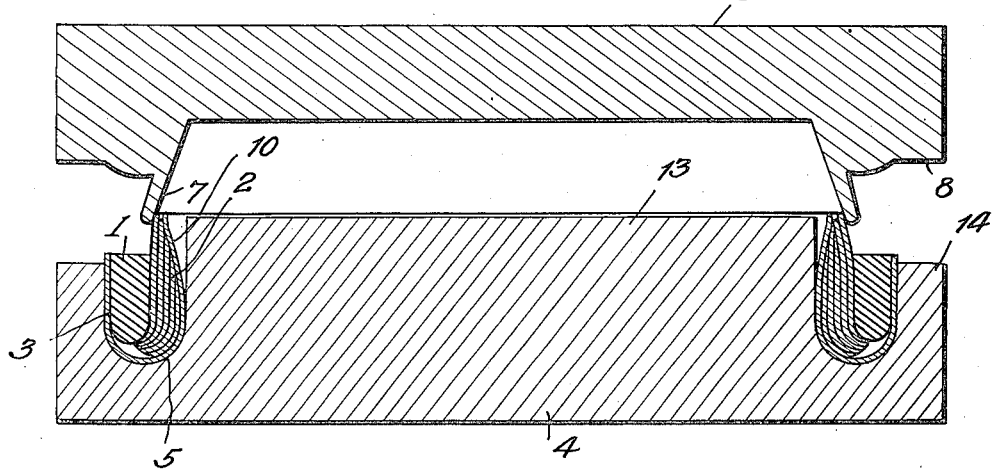
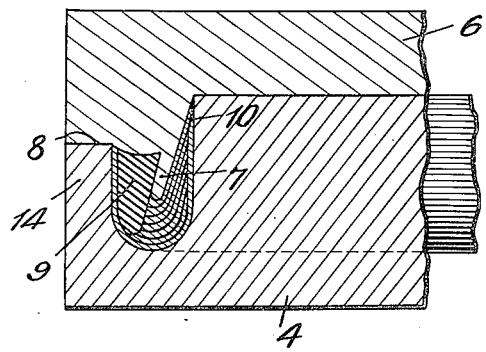
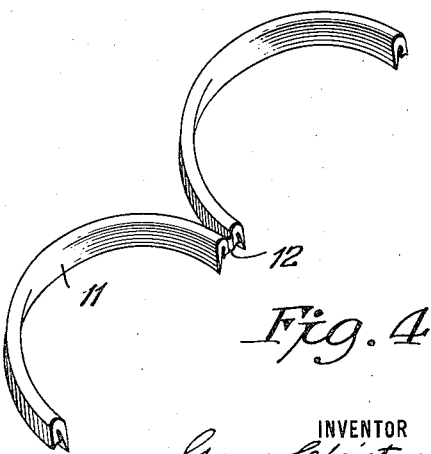
INVENTOR
George Christenson
BY
A. Parker Smith
ATTORNEY Patented Aug. 28, 1923.

1,466,086

UNITED STATES PATENT OFFICE.

GEORGE CHRISTENSON, OF NORTH PLAINFIELD, NEW JERSEY, ASSIGNOR TO JOHNS-MANVILLE INCORPORATED, A CORPORATION OF NEW YORK.

METHOD OF MAKING PISTON-ROD PACKING.

Application filed September 1, 1920. Serial No. 407,496.

*To all whom it may concern:*

Be it known that I, GEORGE CHRISTENSON, a citizen of the United States of America, residing at North Plainfield, county of Somerset, State of New Jersey, have invented certain new and useful Improvements in Methods of Making Piston-Rod Packing, of which the following is a specification.

My invention relates to the manufacture of composite rod packing rings described and claimed in my U. S. Patent No. 136,565, granted December 28, 1920. Said packing ring comprises a plurality of superposed layers of textile fabric of widths graduated so as to form a flexible lip of V-shaped cross section arranged to bear against the piston rod, the wider end of the V being rooted in a mass of plastic material which forms a thick and relatively rigid heel for the lip, the heels of a series of the rings, when in operative position, occupying the outer portion of the stuffing box in which they are placed, and receiving the thrust of the stuffing box gland, leaving the lips free to flex away slightly from the piston rod when not subjected to fluid pressure. The proper arrangement of just the right proportion of these parts in a mold, and the maintenance of them in proper relative positions during the molding operation by ordinary methods is quite difficult. My invention supplies a conveniently rapid and accurate method of making these rings. The best method of carrying out my invention at present known to me is illustrated in the accompanying drawings in which, Fig. 1 is a perspective view of a portion of a composite ribbon used in making the rings.

Fig. 1ª is a similar view of a modified form of ribbon.

Fig. 2, is a central section through a mold and cooperating former with a length of the composite ribbon in position to be molded.

Fig. 3 is a detail section on a similar plane showing the completion of the molding operation, and Fig. 4 is a perspective view, on a smaller scale, of a completed ring.

Throughout the drawings like reference characters indicate like parts; 1, is a layer of plastic material capable of being molded by pressure and hardened by subsequent treatment, such as a mixture containing rubber and sulphur in proportions suitable for vulcanization. 2 is a pile of fabric layers, which may be of asbestos cloth, cemented together and to the layer 1 by a cement, such as a rubber cement, capable of vulcanization. Preferably all but the last of these fabric layers are of gradually decreasing width with the widest one adjacent layer 1, and arranged to form a lip V-shaped in cross section projecting slightly above one edge of the layer 1. The last fabric layer 3, counting away from layer 1, is wide enough to cover the edges of all the other fabric layers and extend around the other edge and side of layer 1, though the edges of the fabric forming the V-lip might be left exposed as indicated in Fig. 1ª.

4 is a mold having an annular cavity 5 of U-shaped cross section bounded on one side by a raised central portion 13, and on the other by an exterior lip or rim 14. A co-operating former 6 has a flaring circular flange 7, adapted to enter cavity 5, and an external shoulder 8, shaped to rest on lip 14 of the mold and completely close cavity 5 when the central portion of the former 6 rests on the raised central portion 13 of the mold, as shown in Fig. 3.

The flange 7 of the former is so shaped as to separate the pile of fabric 2 from the layer of plastic material 1 when forced into cavity 5, and to press the thin edge of the V-shaped pile of fabric inward to give the thin edged flexible lip 10 formed by said fabric across a cylindrical inner surface, as indicated in Fig. 3. At the same time it, in conjunction with lip 14 of the mold, forms the plastic mass 1 into the thick heel 9 of the packing ring. The materials may be vulcanized by heat while still in the closed mold shown in Fig. 3.

In performing my process a portion of one of the composite ribbons shown in Figs. 1 or 1ª, of sufficient length to form a ring of the desired diameter, is cut off and placed in the cavity 5 of mold 4, the abutting ends of the ribbon having first been covered with a film of graphite, though this step may be omitted if a continuous ring is to be formed. The former 6 is then forced down on the mold closing the same and forcing the components of the ribbon into their proper positions as shown in Fig. 3. The rubber constituents of the ring so formed may then be vulcanized in the mold by heat, giving the whole body permanency of form and elasticity. After the completed ring 11 is removed from the mold the abutting ends may be separated, as the interposed film of graphite has prevented them being vulcanized together, and the fabric 2 and mass 1 are cut through up to the outer portion of fabric wrapping 3, which latter is left intact to form the hinge 12, connecting the two halves so that the split ring so formed can be placed around a piston rod without distorting the parts.

Having described my invention, I claim:

1. The process of forming a composite ring packing which comprises the following steps: first, forming a ribbon composed of a plurality of superposed layers of flexible fabric cemented together and a relatively thick layer of plastic material adhering to one side of said fabric body; second, shaping said ribbon into the form of a closed loop with the fabric on the inside of said loop; third, partially separating the plastic material from the fabric and compressing the latter into a wedge-shaped cross-section, leaving the thick end of said wedge adhering to said plastic material.

2. The process of forming a composite ring packing, which comprises the following steps: first, forming a ribbon composed of a plurality of superposed layers of flexible fabric cemented together and a relatively thick layer of plastic material adhering to one side of said fabric body; second, shaping said ribbon into the form of a closed loop with the fabric on the inside of said loop; third, partially separating the plastic material from the fabric and compressing the latter into a wedge-shaped cross-section, leaving the thick end of said wedge adhering to said plastic material; and, fourth, vulcanizing the mass so formed.

3. The process of forming a composite split packing ring for piston rods, which comprises the following steps: first, forming a ribbon composed of a relatively thick layer of rubber composition and a plurality of superposed layers of textile fabric cemented together with rubber cement and attached to the layer of rubber composition, the series of fabric layers being of gradually decreasing width with the widest layer attached to the mass of rubber composition, except that the last and outer layer is wide enough to cover all the intermediate layers and also extend around the thick edge of the pile so formed and around one edge and one side of the layer of rubber composition; second, shaping said ribbon in the form of a closed loop with the fabric on the inside of the loop, the cross-section of the ribbon being substantially U-shaped in external contour, and a film of graphite being inserted between the abutting ends of said ribbon; third, partially separating the plastic material from the fabric and compressing the latter into a wedge-shaped cross-section, leaving the thick end of said wedge adhering to said plastic material; fourth, vulcanizing the mass so formed; and, fifth, separating the graphited ends and cutting the layer so formed at a point midway between its separated ends, from the inside, through the pile of the fabric and the layer of rubber composition but leaving the outer portion of the last mentioned fabric layer intact to serve as a hinge connecting together the two halves of the loop so formed.

GEORGE CHRISTENSON.

Witnesses:
JOHN J. REYNOLDS,
WILLIAM N. ALLMAN.